US009330668B2

(12) United States Patent
Nanavati et al.

(10) Patent No.: US 9,330,668 B2
(45) Date of Patent: May 3, 2016

(54) SHARING VOICE APPLICATION PROCESSING VIA MARKUP

(75) Inventors: Amit Anil Nanavati, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 2399 days.

(21) Appl. No.: 11/312,300

(22) Filed: Dec. 20, 2005

(65) Prior Publication Data
US 2007/0143113 A1    Jun. 21, 2007

(51) Int. Cl.
| G10L 15/00 | (2013.01) |
| G10L 15/30 | (2013.01) |
| G10L 15/01 | (2013.01) |
| G06F 17/27 | (2006.01) |

(52) U.S. Cl.
CPC .............. *G10L 15/30* (2013.01); *G10L 15/00* (2013.01); *G10L 15/01* (2013.01); *G06F 17/2705* (2013.01)

(58) Field of Classification Search
CPC ......... G10L 15/01; G10L 15/02; G10L 15/30; G10L 2015/02; G10L 15/26; G10L 13/02; G10L 15/00; G10L 15/06; G10L 15/18; G10L 15/22; G10L 15/265; G10L 17/00; G10L 13/00; G06F 17/27
USPC .......................................... 704/257, E15.047
See application file for complete search history.

(56) References Cited

U.S. PATENT DOCUMENTS

| 6,600,737 | B1 | 7/2003 | Lai et al. |
| 6,804,330 | B1 | 10/2004 | Jones et al. |
| 7,330,815 | B1* | 2/2008 | Jochumson .................. 704/231 |
| 2002/0143551 | A1 | 10/2002 | Sharma et al. |
| 2002/0178182 | A1* | 11/2002 | Wang et al. ................. 707/501.1 |
| 2003/0125955 | A1* | 7/2003 | Arnold et al. ............... 704/270.1 |
| 2003/0182131 | A1* | 9/2003 | Arnold et al. ................. 704/275 |
| 2004/0006476 | A1 | 1/2004 | Chiu |
| 2004/0044522 | A1* | 3/2004 | Yang et al. ..................... 704/201 |
| 2004/0107107 | A1* | 6/2004 | Lenir et al. ................. 704/270.1 |

(Continued)

FOREIGN PATENT DOCUMENTS

| JP | 2003-169329 A | 6/2003 |
| JP | 2004-213570 A | 7/2004 |

(Continued)

OTHER PUBLICATIONS

Chinese Office Action, Chinese Patent Application No. 200680048024.8, Dated Oct. 8, 2010, 5 pages.

(Continued)

*Primary Examiner* — Melanie Jagannathan
*Assistant Examiner* — Najeebuddin Ansari
(74) *Attorney, Agent, or Firm* — Gibb & Riley, LLC

(57) ABSTRACT

A system is described for processing voice applications comprising a client device (10) having associated data indicative of its computing capability. The system has access to a plurality of scripts specifying tasks to be performed in a voice-based dialog between a user and the system. The scripts are interpretable at a browser level. A server (20) selects an appropriate script for the client device (10) based on the associated data. An interpreter layer processes the selected script to determine a first set of instructions to be performed on the client device (10) and a second set of instructions to be performed on the server (20) for the dialog. Computation is thus shared between the client device and the server based on the computational capability of the client.

19 Claims, 4 Drawing Sheets

(56) References Cited

U.S. PATENT DOCUMENTS

| | | | |
|---|---|---|---|
| 2004/0225499 A1* | 11/2004 | Wang et al. | 704/257 |
| 2005/0091059 A1* | 4/2005 | Lecoeuche | 704/270.1 |
| 2005/0119896 A1* | 6/2005 | Bennett et al. | 704/270.1 |
| 2006/0009980 A1* | 1/2006 | Burke et al. | 704/270 |
| 2006/0052080 A1* | 3/2006 | Vitikainen et al. | 455/403 |
| 2006/0083362 A1* | 4/2006 | Anisimov et al. | 379/88.17 |
| 2006/0184626 A1* | 8/2006 | Agapi et al. | 709/205 |
| 2006/0198359 A1* | 9/2006 | Fok et al. | 370/351 |
| 2006/0271351 A1* | 11/2006 | Mirkovic et al. | 704/4 |
| 2006/0287854 A1* | 12/2006 | Smolenski et al. | 704/231 |
| 2007/0011678 A1* | 1/2007 | Lee et al. | 718/100 |

FOREIGN PATENT DOCUMENTS

| | | |
|---|---|---|
| JP | 2005-055607 A | 3/2005 |
| TW | 567465 | 12/2003 |
| WO | WO 02091364 A1 | 11/2002 |
| WO | WO 03091827 A2 | 11/2003 |
| WO | WO 03101070 A1 | 12/2003 |

OTHER PUBLICATIONS

Taiwan Office Action Communication, dated Jun. 22, 2012.

* cited by examiner

SHARING VOICE APPLICATION PROCESSING VIA MARKUP

FIELD OF THE INVENTION

The present invention relates to processing voice applications in a client-server environment.

BACKGROUND

In recent years there has been immense growth in the information and services available electronically, as evidenced in the widespread use of the Internet. Typically, a user interacts with the system by typing information, for example using a keyboard or touch screen, and viewing the results on a video display. However, conversational systems are increasingly available that allow the user to input information verbally. The system output may be provided aurally to the user. Such conversational systems permit the user to readily obtain information and services while on the move, leaving the user's hands free for other tasks.

Conversational systems require speech recognition to understand the user and speech synthesis to render information in a human-like voice. Typically, such systems execute in a telephony infrastructure where the client devices are telephone instruments such as mobile handsets. Originally, such conversational systems worked with dumb client devices and consequently all of the speech processing (recognition and synthesis) was performed in servers communicating with the dumb clients. However, the increase in processing capability of handheld clients has made speech processing (both recognition and synthesis) possible at the client side.

In some conversational systems part of the speech recognition is processed on a client device. The term 'Distributed Speech Recognition' is used to refer to systems that allow applications to combine local speech processing on the client device with remote access to network-based speech services. For example, signal processing such as noise reduction may be executed on the client device, which then sends the processed data to a network-based speech service. In turn, the speech service processes the received signal to determine the user's request and responds to the user using a voice output.

Another known technique that uses the processing capability of the client is Embedded Concatenative Text-To-Speech (eCTTS), in which part of the speech synthesis is done at the client. Speech segments are kept as compressed feature vectors which may be reconstructed back to speech.

In another known approach, a conversational system may reside completely on the client and the entire speech recognition process is performed locally. Since clients typically have a limited processing capacity, only very small conversational systems can be executed on such devices.

Notwithstanding the existing art, there is an ongoing need for more efficient and versatile systems for processing voice applications.

SUMMARY

A flexible mechanism is described in which the computation relating to a dialog is shared between a client and a server based on the computational capability of the client. The distribution is performed at a markup level and the method enables scripts that may be executed by the client device.

According to a first aspect of the invention there is provided a method of processing voice applications on a server in a client-server computing system. Data indicative of a computing capability of the client is received. Based on said received data, a set of instructions specifying tasks to be performed by the client in a voice-based dialog between a user and the computing system is selected. The set of instructions is provided to the client for execution.

According to a further aspect of the invention there is provided a method of processing voice applications on a client device in a client-server computing system. A script is received from the server, the script being selected dependent on data indicative of a computing capability of the client device. The script is parsed to determine a set of instructions to be performed by the client device in a voice-based dialog between a user and the client-server computing system. The instructions are executed on the client device.

According to a further aspect of the invention there is provided a server for processing voice applications in a client-server computing system. The server firstly comprises means for receiving data indicative of a computing capability of said client. The server also has means for selecting, based on the received data, a set of instructions specifying tasks to be performed by the client in a voice-based dialog between a user and the computing system. The server also has means for providing the set of instructions to the client for execution.

According to a further aspect of the invention there is provided a client device for processing voice applications in a client-server computing system. The client device comprises means for receiving a script from the server, the script being selected dependent on data indicative of a computing capability of the client device. There also is means for parsing the script to determine a set of instructions to be performed by the client device in a voice-based dialog between a user and the client-server computing system, and means for executing the instructions on the client device.

According to a further aspect of the invention there is provided a computer program product comprising machine-readable program code recorded on a machine-readable recording medium, for controlling the operation of a server on which the program code executes to perform a method of processing voice applications in a client-server computing system. The method comprises the steps described above.

According to a further aspect of the invention there is provided a computer program product comprising machine-readable program code recorded on a machine-readable recording medium, for controlling the operation of a client device on which the program code executes to perform a method of processing voice applications in a client-server computing system. The method comprises the steps described above According to yet a further aspect of the invention there is provided a system for processing voice applications. The system comprises a client device having associated data indicative of a computing capability of the client device. The system further comprises data storage storing a plurality of scripts specifying tasks to be performed in a voice-based dialog between a user and the system. There further is a server that selects an appropriate script for the client device based on the associated data. An interpreter layer processes the selected script to determine a first set of instructions to be performed on the client device and a second set of instructions to be performed on the server for the dialog. A synchronisation layer synchronises the execution of the first and second sets of instructions.

DESCRIPTION OF THE DRAWINGS

One or more embodiments of the invention are described below with reference to the drawings, in which.

DETAILED DESCRIPTION

The techniques described herein provide a flexible mechanism for sharing dialog processing between the client and the server. Scripts are enabled that can be executed at the client. In the described arrangement, the server has access to various versions of scripts, each tailor-made for a corresponding device profile.

Figure 1:
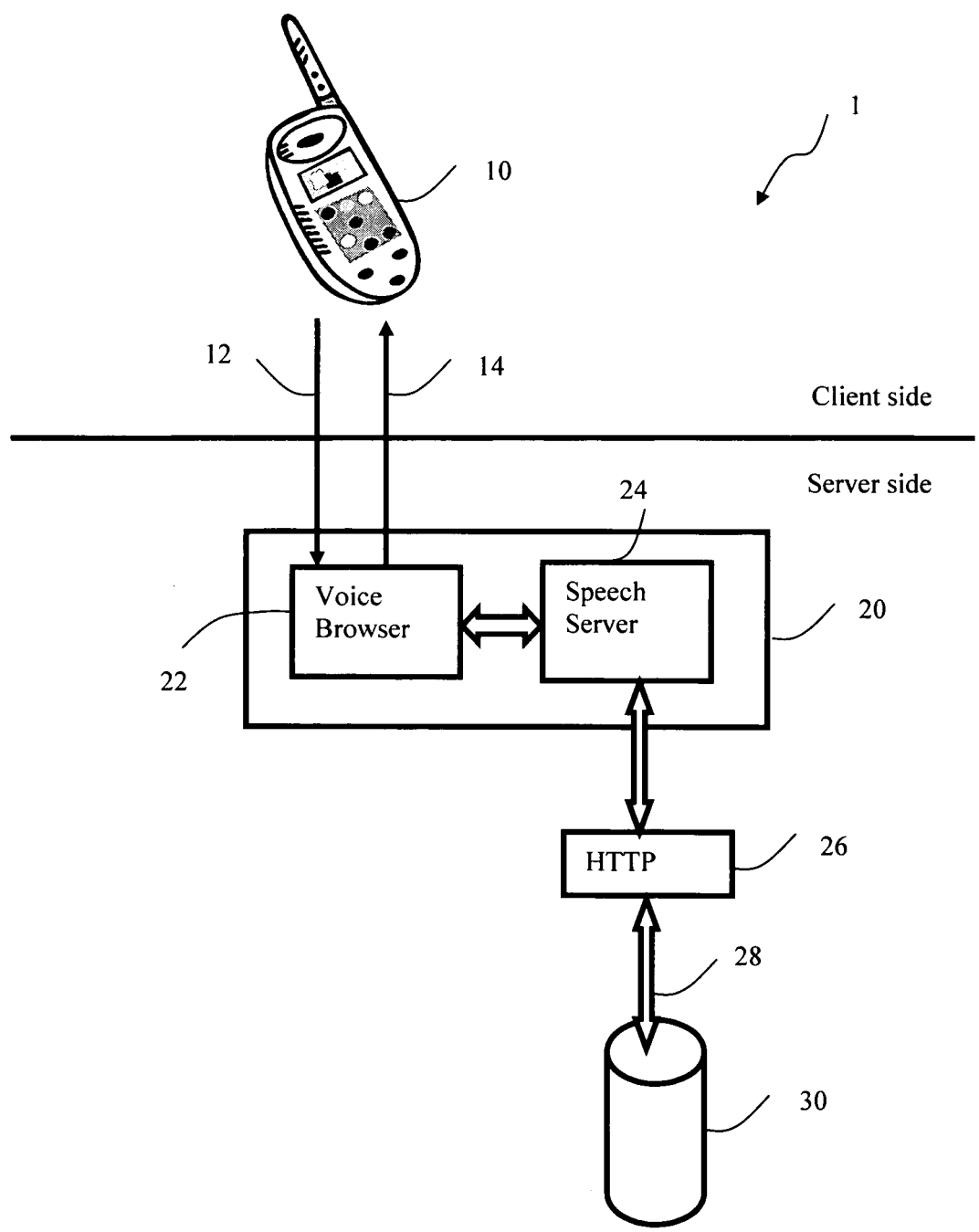
FIG. 1 is a schematic representation of a client-server arrangement suitable for performing the techniques described herein.

FIG. 1 shows a system 1 having a client device 10 and a server 20. As illustrated, the client device 10 is a mobile phone handset. However, the client 10 may be any voice-enabled device with computational resources. For example, the client device 10 may be a personal digital assistant (PDA) or a general-purpose computer with a microphone and one or more speakers enabling the computer to detect spoken input and provide audible output. The client device has sufficient processing capability to run an embedded speech recognition engine.

The client device 10 transmits information 12 to the server 20, and receives information 14 from the server 20, for example via a cellular telephone network. The hardware structures of the server 20 and client device 10 are discussed below with reference to FIG. 3.

The server 20 includes a speech server 24 and a voice browser 22. The speech server 24 performs automated speech recognition (ASR) to convert requests received from a user of the client device 10 into a format more suited to further processing. The data 12 received from the client device 10 may include speech and also audio input such as dual tone multiple frequency (DTMF) keyed input.

The speech server 24 also converts information into audio using a text-to-speech (TTS) capability. The audio is sent with the data 14 back to the client device 10.

The voice browser 22 receives the input data 12 and outputs data 14. In prior art systems using a similar architecture to that seen in FIG. 1, the voice browser 22 is merely a conduit between the client device 10 and the speech server 24. However, in the presently-described arrangement, the voice browser 22 specifies the dialog and/or speech processing to be performed on the client device 10. By adaptively sharing processing based on the capability of the client device 10, the system 1 increases efficiency by reducing server roundtrips.

The server 20 may access information and services using a HyperText Transfer Protocol (HTTP) facility 26. As illustrated, the information and service are sourced from data store 30. However, in practice there are many sources for the information and services accessible using system 1. The communication link 28 between the HTTP facility 26 and the data store 30 may, for example be the Internet or a Local Area Network. The link 28 may simply be a point-to-point connection.

The data 12 sent from the client device 10 to the voice browser 22 includes speech, text and parameters defining a profile of the client device 10. The voice browser 22 selects a script (referred to as the "voice-script") that specifies what processing is to be done on the client device 10. Thus, the capability of the client device 10 and the voice-script determine the division of processing between the server 20 and the client device 10. The use of the voice-script provides flexibility in determining which dialogs are processed locally on the client 10 and which part of the speech processing occurs on the client 10 rather than on the server 20.

The data 14 sent from the voice browser 22 to the client device 10 includes the voice-script and speech. The client device 10 executes the voice-script. The speech server 24 is not affected by the distribution of processing tasks between the server 20 and client device 10.

In one arrangement the voice-script is written using the Voice eXtensible Markup Language (VoiceXML). VoiceXML is a scripting language based on XML that is gaining acceptance as a standard for interactive voice-enabled applications. VoiceXML provides a platform-independent language for writing voice applications based on audio dialogs. There are two main types of dialog. Forms present information and gather input, and menus present a set of choices.

Figure 2:
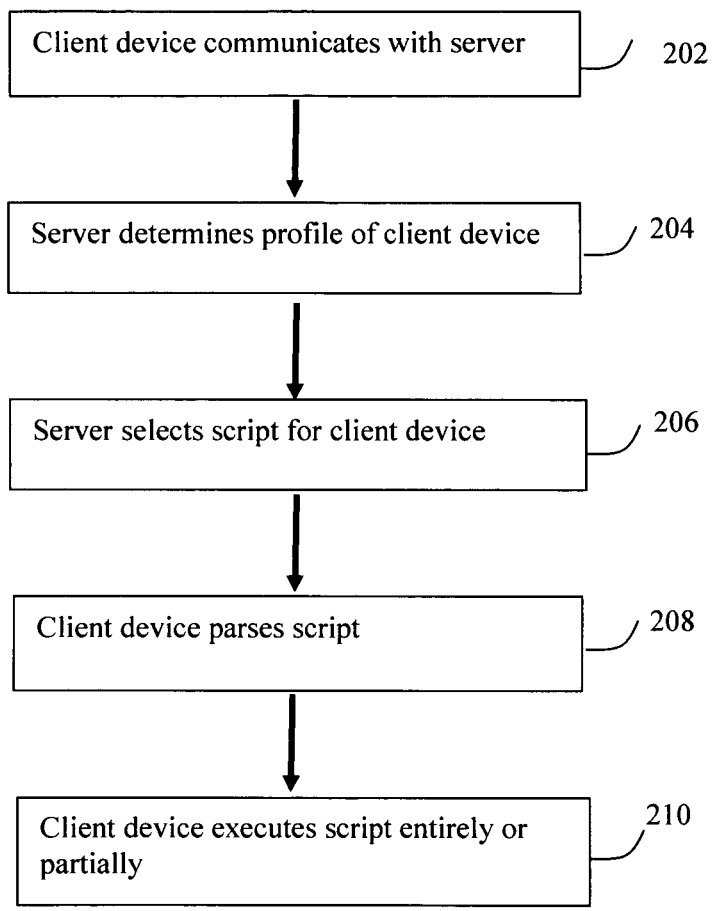
FIG. 2 is a flow diagram of a method for flexibly distributing computation between the client and the server.

FIG. 2 is a flow chart of the method of flexibly sharing processing between the client 10 and the server 20. In step 202 the client 10 communicates with the server 20, providing parameters that define the capability of the client device 10. The server 20 may be informed of the client capability at the call set-up time, or alternatively the server 20 may already be notified of the client capability. For example, information may be associated with a telephone number to inform the server 20 that the telephone number is used by a client device having a particular capability.

The parameters describing the client capability include the amount of memory available, the processing capability and the battery power. Other parameters may also be used, including data identifying that certain hardware or software resources (such as programs or protocols) are available on the client.

The server, in step 204, uses the parameters to determine a profile of the client device 10. In step 206 the server 20 selects an appropriate voice script and sends the selected script to the client device 10. The server has access to a plurality of voice scripts, each tailor-made for a particular device profile. The voice script specifies the dialog and/or speech processing to be done at the client 10 and also specifies what portions may be performed at the server 20. The speech recognition engine is already installed on the client device 10, and the script defines the processing steps which, in order to execute, use the speech recognition engine.

The client device 10 parses the voice script (step 208) and, in step 210, the client device 10 executes the voice script entirely or partially. The client device 10 interprets the script to determine what tasks need to be done and in what order. The client device 10 then performs the specified speech recognition and synthesis tasks as required by the script. For example, the voice script may specify that the client device needs to synthesize a prompt and play the prompt to the user. The client device calls the speech synthesis engine to synthesize the prompt. Next, the client device receives the spoken response of the user and processes the response using a speech recognition system. A grammar of expected responses from the user is provided in the script. The output of the speech recognition system is used to determine the next step to perform, as specified in the voice script.

Due to runtime constraints, the client device 10 may not be able to support the computation specified by the voice script. The client 10 may then choose to behave as a dumb client. In this case, the client-server exchanges support the required multiple interactions.

In one arrangement the voice-script consists of Javascript™ for dialogs and speech. The voice-script sent to the client device 10 mentions what may be done on the client device. The voice-script includes device-sensitive constructs such that, by parsing the script, the client may determine what processing may be done on the client. The voice script includes grammar constructs, which are required for dialog processing, and speech constructs, which are required for speech processing. The constructs of the voice script also includes an 'optional modality' for differentiating between text that is categorized as 'must-have' or 'may-have', and for identifying speech that is categorized as 'must-have'.

The language of the voice server is an extension of VXML that supports the feature of distributing the processing between the server 20 and the client device 10. The language contains markup tags that are not defined in VXML, and which are used by the parser to generate VXML Server and VXML Client from extended VXML. Some of the additional tags are described below.

1. <Block process="client/Server" splitblock="25">

This is used if there is a big block to be processed. Instead of processing the large block on either the server 20 or client 10, the extended language provides features to split the block into two parts and then process the two parts on the client and the server respectively. Here, splitblock="25" means that the first 25 characters of the block will be processed on the client device 10 and the rest will be processed on the server 20.

2. <merge source="client" destination="server">

If there are questions that have to be prompted by the client device 10, the questions may be merged depending upon the profile of the client. The profile of the client 10 includes information about the amount of memory available and whether a user on the client 10 is in a hurry or not. If the user is in a hurry then the questions may be merged and may be asked by the client or the server as per specifications. There may be other criteria for merging.

3. <split source="Client or Server" destination="client">

If there is any question that is not recognized by the server 20 or the client 10 in n attempts, then the question may be split into different prompts. The questions are asked by the client device 10 or the server 20 as specified in the destination. There may be other criteria for splitting. The underlying grammar (nested or sequential) of the question plays a role in determining the split.

In the case of nested grammar, generally the last answer needs to be returned to the server rather than all answers to split prompts.

Example of Nested Grammar:
a. Which state?
b. Which city?
c. Which airport?

If the answer has to be submitted further, only the last answer may be of interest, as the purpose was to determine which airport. The overall question was split into three small grammars due to memory constraints.

In the case of sequential grammar the user is not only interested in the answer of the final question but also the answers of each part of the overall question. After some kind of splitting the answers related to each sub-part must be concatenated and stored in the end to produce an equivalent effect to recognizing the whole grammar at the server itself.

Example of Sequential Grammar:
a. What is the first name?
b. What is the last name?
c. What is the location?

In this case we are interested in the complete answer because the merged question was "Whose phone number do you want and at which location?", to which an answer may be (Nitendra Rajput at office)

Different Possibilities Related to Splitting and Merging

1) The whole question is recognized at the server 20 and the whole Big Grammar related to the question need not be split.

2) The question is divided into several small parts and the speech recognition is done at the client end. The grammar related to the prompt is transferred to the client device 10 every time. The grammar is dependent upon the answer given by user in the case of a nested grammar, but in the case of sequential grammars the transferred grammar can be independent of the answer or may be dependent upon the earlier answer(e.g. Boolean answers) given by user.

3) Another possibility may be that out of several small parts some parts are recognized at the server 20 and other parts recognized at the client device 10. In this arrangement the grammars related to the questions to be recognized at the client 10 are transferred to the client.

4) There is a potential problem in shipping grammars. Even if the client 10 does not have to return anything to the server 20 then the client will still have to go back to the server so that the server can ship an appropriate grammar depending upon earlier answers. This will increase the time response of client 10. So, if the client has sufficient memory to handle all the grammar, then all the grammar should be transferred to the client to prevent the client from having to go back to the server to have the appropriate grammar shipped.

Example:
a. Which State?
b. Which City?

In this case second question is independent of the first. So we can keep the grammars of all cities of all states at the client 10 (if the client's capability permits this) instead of transferring appropriate grammars for the second question based upon the answer to the previous question.

5) In ideal conditions the memory of server 20 is effectively infinite, so any number of questions may be merged on the server 20. However, at the client device 10, the grammar merging is done in view of the memory constraint of the client 10. Several merging combinations of prompts may be possible. This means that if a plurality of questions is sent to the client 10 for merging, it is possible that not all questions are merged at the client.

Example:
a. What is your name?
b. What is your address?
c. What is your father's name?

These three questions are sent to be merged at the client 10. However, it may be that only the first and last of the questions are merged, taking into account the memory constraints of the client 10.

6) The splitting/merging need not be done on the basis of the memory constraints of client 10. Other possible considerations include a count of the number of 'no matches', or a count of the number of 'no inputs". Merging may be done if the user is in a hurry and splitting may be done if the user is not able to handle big questions but prefers answering only small questions. Splitting may be done on the basis of information provided by the user. For example, if the user provides more information than required by the corresponding prompt, then splitting can be done.

Example:
a. What is your name?
b. What is your surname and date of birth?

If the user's answer to the first question is 'Neeraj Chaudhary', then the second question may be split into 2 parts and only the question "What is your date of birth?" will be asked.

Appendix A includes a sample program in the extended VXML language. As illustrated, the sample program may be parsed and divided into two portions which may be run on the server 20 and client device 10 respectively.

Communication Layer (Synchronization Protocol)

Figure 4:
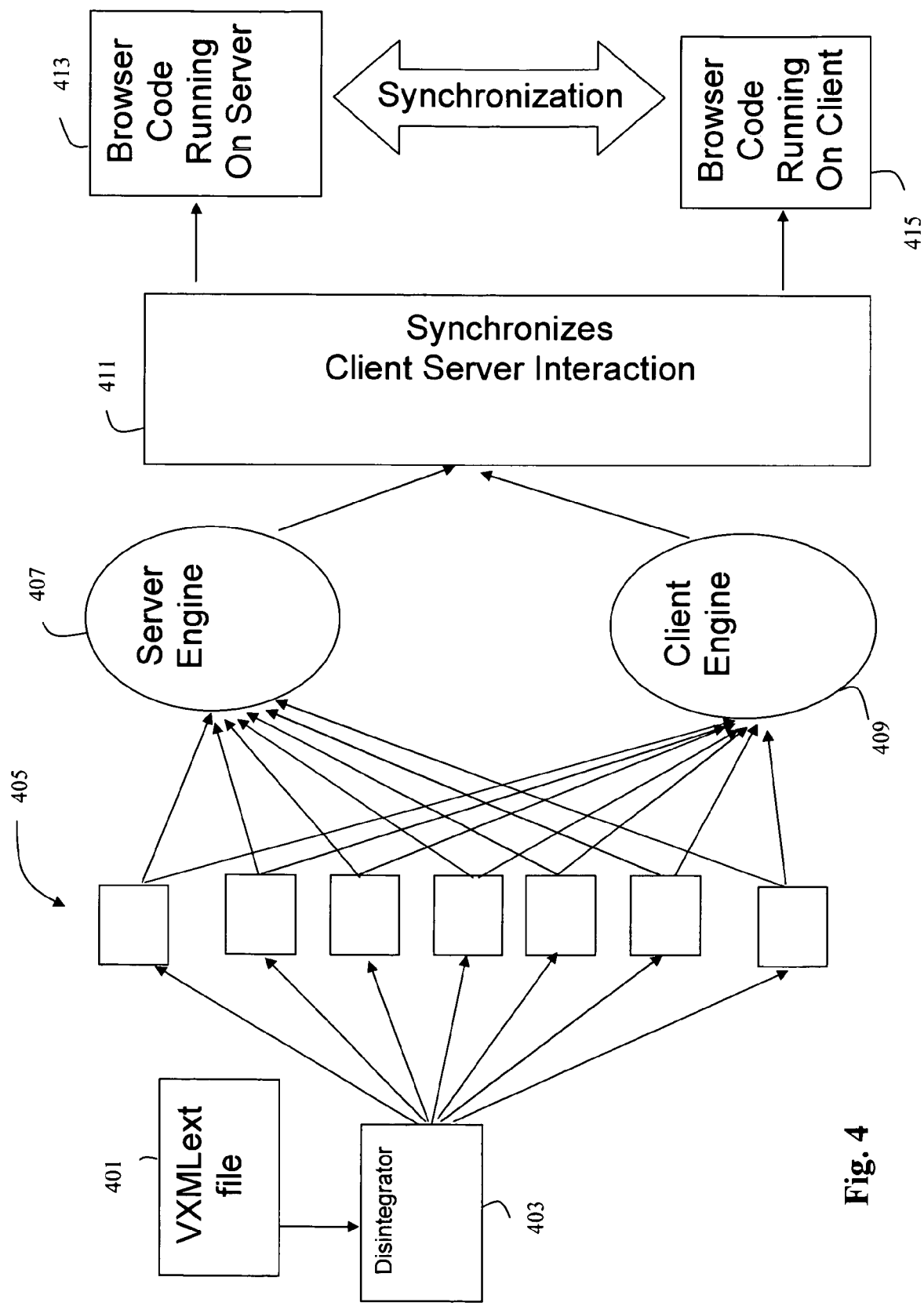
FIG. 4 is a schematic representation of a communication layer that provides synchronization between the client and the server.

FIG. 4 illustrates a communication layer used in synchronizing the processing performed on the client 10 and the server 20. The voice script (i.e. the VXMLext file) 401 is processed in a VXMLext Interpreter Layer, which includes Disintegrator 403 and the set of function-specific modules 405 of the Interpreter. The Interpreter Layer is part of the parsing done by the client 10 and the server 20. In one arrangement, the Interpreter Layer may be part of a Voice Browser which resides both on the client and the server, i.e. a client voice browser and a server voice browser 22.

Outputs of the function-specific modules 405 are provided to a server engine 407 running on the server 20 and a client engine 409 running on the client 10. In turn, the engines 407, 409 are in communication with the synchronizer 411 that synchronizes the client-server interaction. The synchronizer 411 interacts with browser code 413 running on the server 20 and browser code 415 running on the client 415. The synchronizer 411 and browser codes 413, 415 together make up the communication layer.

When more than one value is specified in the 'destination' (separated with a '/'), the first value is the preferred destination. If the tag is unable to execute in the first destination, the execution is performed on the next specified location. Values that are combinations of these primary values have the following implication in the execution sequence:

- client/server: Execute on the client. If the execution is unsuccessful, execute on the server.
- client/partial/server: Execute on the client. If the execution is unsuccessful, do a partial execution on the client and the rest on the server. If this is also unsuccessful, execute on server.
- client/split: Execute on the client. If unsuccessful, split the dialog into subdialogs and then execute on the client.
- client/split/server: Execute on the client. If unsuccessful, split the dialog into subdialogs and execute on the client. If this is also unsuccessful, execute the dialog on the server.
- client/server/split: Execute on the client. If unsuccessful, execute on the server. If this is also unsuccessful, split the dialog into subdialogs and execute on client. If this also fails, execute the subdialogs on the server.
- server/client: This value is valid but meaningful only to the <merge> and <block> tags. When used with <merge>, the merged dialog will execute on the server and if this is unsuccessful, the dialog is split and then executed on the client.

The synchronisation layer will now be described for the case where the destination value is 'client/split/server'.

While processing occurs at the client 10, the server 20 is in waiting mode. If the processing is successful, the client 10 writes a 'successful' message and also writes a recognized string to a file to be sent to server 20. The client 10 then moves to the next dialog which will take place on the client 10 or server 20 as specified in VXMLext (Voice Script) 401.

If processing at the client 10 is unsuccessful, the client continues by again splitting the call flow, using the appropriate module 405 running on the client. The server 20 remains in a waiting state. If all the steps are unsuccessful at client 10 then finally an 'unsuccessful' message is sent to the server 20 and the recognized string is set to the null string. Processing then continues on the server 20, which has better recognition accuracy and better processing capabilities as compared to the client 10.

If a first attempt fails, the server 20 splits the questions. In this case the client 10 has to be made aware of the current status of the server even if attempts at recognition fail at server 20. This is because, even where recognition takes place at the server 20, the client 10 has the jobs of recording the speech, sending the speech to the server 20 and then receiving and playing the synthesized speech.

Where all processing takes place on client 10, the server 20 does not have any role to play and may be kept dormant until everything has been tried on client 10 as allowed by tag "destination".

Since the communication layer transfers the recognized string, the strategy varies for concatenated, sequential and nested call flows.

a). Remember, in case of concatenated questions all the answers should be submitted after concatenating.

Example—What is your name?

The following three parts need to be concatenated:

1. what is your first name?
2. what is your middle name?
3. what is your last name?

b). In case of nested call flows only the answer of the last question needs to be submitted.

Example—We are interested only in the airport, but the following nested questions are asked—

Which state?

Which city?

Which airport?

c). In case of sequential call flows, the answer of the last question needs to be submitted:

Example—We are interested only in the seat number

1. Tell me the seat number between 1 to 20, 21 to 40, 41 to 60, 61 to 80;
2. Tell me your seat number.

The methodology followed to synchronize the client 10 and server 20 is similar for other destination values (server/client, server/client/split, client/server etc.), but the sequence in which events occur will vary depending on the destination value.

Computer Hardware

Figure 3:
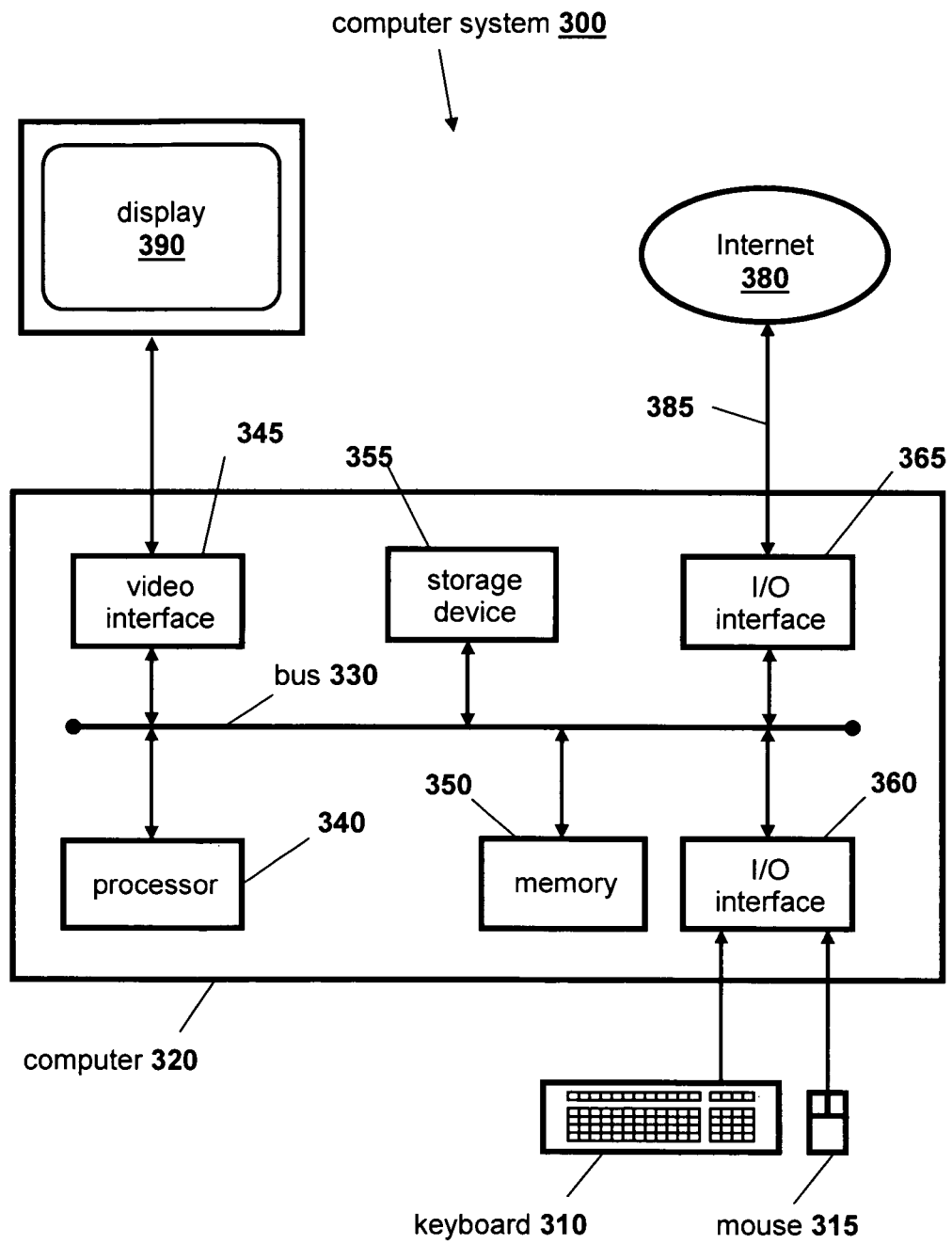
FIG. 3 is a schematic representation of a computing device suitable for use in the arrangement of FIG. 1.

FIG. 3 is a schematic representation of a computer system 300 of a type that is suitable for executing computer software for sharing voice application processing between a client and a server. Computer software executes under a suitable operating system installed on the computer system 300, and may be thought of as comprising various software code means for achieving particular steps. The computer system 300 may be used as the server 20. With the modifications described below, the structure of the computer system 300 may also be used in the client device 10.

The components of the computer system 300 include a computer 320, a keyboard 310 and mouse 315, and a display 390. The computer 320 includes a processor 340, a memory 350, input/output (I/O) interfaces 360, 365, a video interface 345, and a storage device 355.

The processor 340 is a central processing unit (CPU) that executes the operating system and the computer software executing under the operating system. The memory 350 may include random access memory (RAM) and read-only memory (ROM), and is used under direction of the processor 340.

The video interface 345 is connected to display 390 and provides signals for display on the display 390. User input to operate the computer 320 is provided, for example, from the keyboard 310 and mouse 315. Other types of input, such as a microphone, may also be used. Signals may also be output audibly, using one or more speakers (not shown). The storage device 355 may include a disk drive or any other suitable storage medium.

Each of the components of the computer 320 is connected to an internal bus 330 that includes data, address, and control buses, to allow components of the computer 320 to communicate with each other via the bus 330.

The computer system 300 may be connected to one or more similar computers via a input/output (I/O) interface 365 using a communication channel 385 to a network, represented in FIG. 3 as the Internet 380.

The computer software may be recorded on a portable storage medium, in which case the computer software program is accessed by the computer system 300 from the storage device 355. Alternatively, the computer software can be accessed directly from the Internet 380 by the computer 320. In either case, a user can interact with the computer system 300 using, for example, the keyboard 310 and mouse 315 to operate the programmed computer software executing on the computer 320.

Other configurations or types of computer systems can be equally well used to execute computer software that assists in implementing the techniques described herein. Furthermore, custom-made devices and specialised hardware such as digital signal processors may be used in the implementation of the described techniques.

The handheld client device 10 may have a similar computational structure to that shown in FIG. 3. The display 390 and keypad are integrally formed in the client device 10, which typically does not have a mouse 315. The 1/0 interface 365 in client device 10 is a transceiver for sending and receiving signals via a cellular network, and the client device 10 further includes a microphone and speaker to process audible inputs and outputs.

Conclusion

Various alterations and modifications can be made to the techniques and arrangements described herein, as would be apparent to one skilled in the relevant art.

APPENDIX A

VXMLEXTENDED Sample Program

```
<vxmlext>
<block process="client/server" splitblock="25">
... ... ... ... ... ... ... ....
... ... ... ... ... ... ....
</block>
<form id="id_name">
<merge source="client " destination=" server" >
<field name="..... " execute="client">
<prompt> ... ... ... ... ... .... </prompt>
<grammar src="... ... ...."/>
</field>
<field name="....." execute="client">
<prompt> ... ... ... ... ... .... </prompt>
<grammar src="... ... ...."/>
</field>
<p1>... ... ... ... ...</p1>
<gotomerge />
```

-continued

```
</merge>
<fiel dname="... ... ..." execute="client/server">
<prompt>... ... ... ... ... ... ... ... ... ... ... ....</prompt>
<grammar src ="... ... ... ..."/>
<nomatch count="n"> <gotosplit /></nomatch>
<split Source=" client or server" destination= " client">
<p1> ... ... ... ... .... </p1>
<p2> ... ... ... ... ... ... </p2>
<p3> ... ... ... ... ... .... </p3>
<p4> ... ... ... ... ... .... </p4>
</split>
</field>
</form>
</vxmlext>
```

This file is fed to the parser, and the following 'VXML server' and 'VXML client' files are generated and made to run on the server and client respectively.

VXML Server Generated

```
<vxml>
<block>
< ... ... ... ... after 25 characters>
</block>
----------------------------------After merging--------------------
<form id="..... ">
<field name= "... ... ... ">
<prompt>p1 ... ... ...</prompt>
<grammar src="grammar destination after merging"/>
</field>
-----------------------Before Splitting-------------------------------
<field name=" ... ... .... ">
<prompt> ... ... ... ... ... ... ... ... ... .....</prompt>
<grammar src=" grammar destination before splitting"/>
</field>
</form>
</vxml>
```

VXML Client Generated

```
<vxml>
<block>
first 25 characters ... ... ... ... ....
</block>
<form id="... ...... ">
-----------------------------Before Merging----------------------------
---------
<field name="...... " >
<prompt> ... ... ... ... ... .... </prompt>
<grammar src="... ... .... "/>
</field>
<feld name="...... " >
<prompt> ... ... ... ... ... .... </prompt>
<grammar src="... ... .... "/>
</field>
---------------Before splitting----------------------------------------
-----------
<fieldname=" ... ... .... ">
<prompt> ... ... ... ... ... ... ... ... ... .....</prompt>
<grammar src=" grammar destination before splitting"/>
</field>
--------------------------------After Splitting------------------------
-----------------
<field name=p1>
<prompt>... ... ... ... ... .....</prompt>
<grammar src="... ... .... "/>
</field>
<field name=p2>
<prompt>... ... ... ... ... .....</prompt>
<grammar src="... ... .... "/>
</field>
```

-continued

```
<field name=p3>
<prompt>... ... ... ... .....</prompt>
<grammar src="... ...."/>
</field>
<field name=p4>
<prompt>... ... ... ... .....</prompt>
<grammar src="......."/>
</field>
</form>
</vxml>
```

Tag Library
1. merge
Attributes
   Source
   Destination
2. split
Attributes
   Source
   Destination
3. Block
New Attributes
   Process
   Splitblock
4. Field
New Attributes
   execute
5. Gotomerge
7. Gotosplit
8. Vxmlext
   This tag is inserted to differentiate the language from normal Vxml as it has various other features
Certain tags for merging and splitting prompts are also added (Syntax <p(promptnumberafter p)>)

We claim:

1. A computer-implemented method of processing voice applications in a client-server computing system comprising a server device and a client device, said method comprising performing on said server device:
   receiving, at said server device, data from said client device indicative of a computing capability of said client device, said data comprising:
      a measure of memory available on said client device,
      a battery power of said client device,
      a processing capability of said client device, and
      information identifying one or more resources available on said client device;
   determining, at said server device, a profile of said client device based on said data received from said client device indicating said computing capability of said client device;
   selecting, based on said profile of said client device, a set of instructions allocating a division of voice-based dialog processing or speech processing tasks to be performed between said client device and said server device;
   providing said set of instructions to said client device for execution of said voice-based dialog processing or said speech processing tasks based on said division of said voice-based dialog processing or said speech processing tasks;
   enabling said client device to parse said set of instructions and execute, at least partially, said voice-based dialog processing or said speech processing tasks; and
   synchronizing execution of said voice-based dialog processing or said speech processing tasks between said client device and said server device.

2. The method according to claim 1, further comprising:
   executing, on said server device, one or more of said voice-based dialog processing or said speech processing tasks if said one or more of said voice-based dialog processing or said speech processing tasks are not successfully executed on said client device.

3. The method according to claim 1, said receiving data from said client device indicative of a computing capability of said client device further comprising:
   identifying said client device; and
   retrieving, at said server device, a predefined profile of said computing capability of said client device.

4. The method according to claim 1, said receiving data from said client device indicative of a computing capability of said client device further comprising receiving said data at a runtime of a voice-based dialog.

5. A computer-implemented method of processing voice applications in a client-server computing system comprising a server device and a client device, said method comprising performing on said client device:
   communicating, to said server device, data, from said client device, said data being indicative of a computing capability of said client device, said data comprising:
      a measure of memory available on said client device,
      a battery power of said client device,
      a processing capability of said client device, and
      information identifying one or more resources available on said client device;
   receiving a script from said server device, said script being selected dependent on said data indicative of said computing capability of said client device;
   parsing said script and determining a set of instructions allocating a division of voice-based dialog processing or speech processing tasks to be performed between said client device and said server device;
   determining, based on said script, voice-based dialog processing or speech processing tasks to be performed by said client device according to said set of instructions and an order to perform said voice-based dialog processing or speech processing tasks;
   executing said set of instructions of said voice-based dialog processing or said speech processing tasks on said client device based on said division of said voice-based dialog processing or said speech processing tasks; and
   synchronizing execution of said voice-based dialog processing or said speech processing tasks between said client device and said server device.

6. The method according to claim 5, further comprising:
   sending said data indicative of computing capability from said client device to said server device.

7. The method according to claim 5, further comprising:
   notifying said server device that at least one of said instructions has not been successfully executed on said client device.

8. The method according to claim 5, said dialog comprising prompts to be played to a user and corresponding grammars of expected responses to said prompts, said method further comprising:
   splitting at least one of said prompts and corresponding grammars into a plurality of prompts and corresponding grammars based on said computing capability of said client device.

9. The method according to claim 8, said script comprising one or more destination parameters specifying whether said prompts and grammars are to be executed on one of said server device and said client device.

10. The method according to claim 5, said dialog comprising prompts to be played to a user and corresponding grammars of expected responses, a plurality of said prompts and corresponding grammars being merged into a single prompt and corresponding grammar based on said computing capability of said client device.

11. A server processing voice applications in a client-server computing system, said server:
receiving, at said server comprising a processor, data from a client device indicative of a computing capability of said client device, said data comprising:
a measure of memory available on said client device,
a battery power of said client device,
a processing capability of said client device, and
information identifying one or more resources available on said client device;
determining, at said server, a profile of said client device based on said data received from said client device indicating said computing capability of said client device;
selecting, based on said profile of said client device, a set of instructions allocating a division of voice-based dialog processing or speech processing tasks to be performed between said server and said client device;
providing said set of instructions to said client device for execution of said voice-based dialog processing or said speech processing tasks based on said division of said voice-based dialog processing or said speech processing tasks; and
synchronizing execution of said voice-based dialog processing or said speech processing tasks between said client device and said server.

12. The server according to claim 11, further comprising:
a speech server performing automated speech recognition to convert requests received from a user of said client device into an appropriate format for further processing; and
a voice browser receiving input data from said client device and outputting data to said client device.

13. The server according to claim 12, said speech server converting information into audio using a text-to-speech capability.

14. A client device processing voice applications in a client-server computing system, said client device:
communicating to a server device, data from said client device indicative of a computing capability of said client device, said data comprising:
a measure of memory available on said client device,
a battery power of said client device,
a processing capability of said client device, and
information identifying one or more resources available on said client device;
receiving a script from said server device, said script being selected dependent on said data indicative of said computing capability of said client device, said script allocating a division of voice-based dialog processing or speech processing tasks to be performed between said client device and said server device;
parsing said script to determine a set of instructions to execute said voice-based dialog processing or said speech processing tasks based on said division of said voice-based dialog processing or said speech processing tasks;
determining, based on said script, voice-based dialog processing or speech processing tasks to be performed by said client device according to said set of instructions and an order to perform said voice-based dialog processing or speech processing tasks;
synchronizing said set of instructions to execute said voice-based dialog processing or said speech processing tasks between said client device and said server device; and
executing at least a portion of said set of instructions on said client device.

15. A computer program product comprising machine-readable program code recorded on a non-transitory machine-readable recording medium, for controlling operation of a server on which said program code executes to perform a method of processing voice applications in a client-server computing system, said method comprising:
receiving data indicative of a computing capability of a client device, said data comprising:
a measure of memory available on said client device,
a battery power of said client device,
a processing capability of said client device, and
information identifying one or more resources available on said client device;
determining a profile of said client device based on said data received indicating said computing capability of said client device;
selecting, based on said profile of said client device, a set of instructions allocating a division of voice-based dialog processing or speech processing tasks to be performed between said server and said client device;
providing said set of instructions to said client device for execution of said voice-based dialog processing or said speech processing tasks based on said division of said voice-based dialog processing or said speech processing tasks; and
synchronizing said execution of said voice-based dialog processing or said speech processing tasks between said client device and said server.

16. A computer program product comprising machine-readable program code recorded on a non-transitory machine-readable recording medium, for controlling operation of a client device on which said program code executes to perform a method of processing voice applications in a client-server computing system, said method comprising:
receiving a script from a server device, said script being selected dependent on data indicative of a computing capability of said client device, said data comprising:
a measure of memory available on said client device,
a battery power of said client device,
a processing capability of said client device, and
information identifying one or more resources available on said client device;
parsing said script to determine a set of instructions allocating a division of one of voice-based dialog processing and speech processing tasks to be performed between said client device and said server device;
determining, based on said script, voice-based dialog processing or speech processing tasks to be performed by said client device according to said set of instructions and an order to perform said voice-based dialog processing or speech processing tasks;
executing at least a portion of said set of instructions of said one of said voice-based dialog processing and said speech processing tasks on said client device based on said division of said one of said voice-based dialog processing and said speech processing tasks; and
synchronizing said execution of said voice-based dialog processing or said speech processing tasks between said client device and said server device based on said division of voice-based dialog processing or said speech processing tasks.

17. A system that processes voice applications comprising:
a client device having associated data indicative of a computing capability of said client device, said data comprising:
   a measure of memory available on said client device,
   a battery power of said client device,
   a processing capability of said client device, and
   information identifying one or more resources available on said client device;
data storage storing a plurality of scripts allocating a division of one of voice-based dialog processing and speech processing tasks to be performed between a server and said client device;
a server device determining a profile of said client device based on said associated data and said server device selecting an appropriate script for said client device based on said profile of said client device, said script allocating a division of voice-based dialog processing or speech processing tasks to be performed between said client device and said server device;
an interpreter layer processing said script to determine a first set of instructions to be performed on said client device and a second set of instructions to be performed on said server device, said interpreter layer providing said first set of instructions to said client device for execution of said voice-based dialog processing or said speech processing tasks based on said division of said voice-based dialog processing or said speech processing tasks; and
a synchronization layer synchronizing execution of said first set of instructions and said second sets of instructions between said client device and said server device.

18. The system according to claim 17, said server device further comprising:
a speech server performing automated speech recognition to convert requests received from a user of said client device into an appropriate format for further processing; and
a voice browser receiving input data from said client device and outputting data to said client device.

19. The system according to claim 18, said speech server converting information into audio using a text-to-speech capability.

* * * * *